US012734904B1

(12) United States Patent
Padinjaremury et al.

(10) Patent No.: US 12,734,904 B1
(45) Date of Patent: Sep. 15, 2026

(54) COAST CONTROL FOR ELECTRIFIED VEHICLES TO COMPENSATE FOR DOWNHILL GRADES WITH VARIABLE LOAD

(71) Applicant: FCA US LLC, Auburn Hills, MI (US)

(72) Inventors: Justin J Padinjaremury, Auburn Hills, MI (US); Alexander Yohei Morita, Auburn Hills, MI (US); Brian J Morrison, Auburn Hills, MI (US); Francis J Carr, II, Auburn Hills, MI (US); Rocco Di Leo, Auburn Hills, MI (US); Brian Sharp, Auburn Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 19/081,004

(22) Filed: Mar. 17, 2025

(51) Int. Cl.
*B60L 15/20* (2006.01)

(52) U.S. Cl.
CPC ....... *B60L 15/2027* (2013.01); *B60L 2240/12* (2013.01); *B60L 2240/14* (2013.01); *B60L 2240/26* (2013.01); *B60L 2250/28* (2013.01)

(58) Field of Classification Search
CPC ............. B60L 15/2027; B60L 2240/12; B60L 2240/14; B60L 2240/26; B60L 2250/28
USPC ............................................................ 701/22
See application file for complete search history.

(56) References Cited

U.S. PATENT DOCUMENTS

| | | | |
|---|---|---|---|
| 10,486,546 B2 | 11/2019 | Kurosawa et al. | |
| 11,332,022 B2 | 5/2022 | Ueda et al. | |
| 11,662,724 B2 | 5/2023 | Endo et al. | |
| 11,912,263 B2 * | 2/2024 | Aggoune | B60W 30/18072 |
| 12,391,130 B1 * | 8/2025 | Tuller | B60L 15/2045 |
| 2021/0024073 A1 | 1/2021 | Johri | |
| 2024/0317067 A1 * | 9/2024 | Oh | B60L 7/26 |
| 2024/0399886 A1 * | 12/2024 | McCay | B60L 15/20 |
| 2025/0162568 A1 * | 5/2025 | Wampler | B60W 30/18118 |

* cited by examiner

*Primary Examiner* — Kira Nguyen
(74) *Attorney, Agent, or Firm* — Jeremy J. Klobucar

(57) ABSTRACT

A coast control system and method for a battery electric vehicle (BEV) include determining a minimum pedal torque for the BEV corresponding to a minimum accelerator pedal position to maintain the BEV traveling at a given speed on a flat surface and carrying a nominal load and, based thereon, calculating maximum acceleration thresholds for the BEV for entry to and exit from a coast control feature of the BEV, respectively. When a set of preconditions for the coast control feature are satisfied and a vehicle acceleration of the BEV is greater than the maximum acceleration threshold for entry into the coast control feature, the coast control feature is executed by decreasing a driver torque request for the BEV and the minimum pedal torque by a coast control offset.

20 Claims, 3 Drawing Sheets

COAST CONTROL FOR ELECTRIFIED VEHICLES TO COMPENSATE FOR DOWNHILL GRADES WITH VARIABLE LOAD

FIELD

The present application generally relates to vehicle coast control and, more particularly, coast control for electrified vehicles to compensate for downhill grades with variable load.

BACKGROUND

Battery electric vehicles (BEVs) are a type of electrified vehicle (EV) that do not have an internal combustion engine that generates propulsive torque. An extended-range electrified vehicle (EREV), for example, is one type of EV that has an engine that is only configured for recharging a battery system. For this reason, BEVs are incapable of utilizing engine braking on a downward grade as conventional engine-driven vehicles are capable of doing. Thus, BEVs tend to accelerate more than the driver would expect on a flat grade or compared to a conventional engine-driven vehicle on a downward grade. In these scenarios, the driver must more heavily utilize friction braking, which could cause overheating and excessive wear, particularly for heavy-duty BEV applications capable of carrying large loads (e.g., a heavy-duty BEV pickup truck). Accordingly, while such conventional engine BEV coast control systems do work for their intended purpose, there exists an opportunity for improvement in the relevant art.

SUMMARY

According to one example aspect of the invention, a coast control system for a battery electric vehicle (BEV) is presented. In one exemplary implementation, the coast control system comprises a set of sensors configured to measure at least (i) a vehicle speed of the BEV and (ii) an accelerator pedal position of an accelerator pedal of the BEV, wherein the accelerator pedal is manipulated by a driver of the BEV to provide a driver torque request for the BEV and a control system configured to determine a minimum pedal torque for the BEV corresponding to a minimum accelerator pedal position to maintain the BEV traveling at a given speed on a flat surface and carrying a nominal load, based on the minimum pedal torque, calculate maximum acceleration thresholds for the BEV for entry to and exit from a coast control feature of the BEV, respectively, and when a set of preconditions for the coast control feature are satisfied and a vehicle acceleration of the BEV is greater than the maximum acceleration threshold for entry into the coast control feature, execute the coast control feature by decreasing a driver torque request for the BEV and the minimum pedal torque by a coast control offset, wherein the set of preconditions includes the accelerator pedal position being less than an accelerator pedal position threshold indicative of the driver being off of the accelerator pedal.

In some implementations, the control system is further configured to, while the vehicle acceleration remains above the maximum acceleration threshold for entry to the coast control feature, the control system continues to increase the coast control offset. In some implementations, the control system is further configured to, while the vehicle acceleration remains above the maximum acceleration threshold for entry to the coast control feature, the control system continues to increase the coast control offset up to a calibratable value. In some implementations, the coast control offset is limited by capacity limits of an electrified powertrain of the BEV.

In some implementations, the control system is configured to decrease the driver torque request by the coast control offset by blending in the coast control offset to the driver torque request over an entry period. In some implementations, the control system is further configured to, when the vehicle acceleration falls below the maximum acceleration threshold for entry to the coast control feature while remaining above the maximum acceleration threshold for exit from the coast control feature, maintain the coast control offset. In some implementations, the control system is further configured to, when the vehicle acceleration falls below the maximum acceleration threshold for exit from the coast control feature, end the coast control feature by blending out the coast control offset from the driver torque demand over an exit period.

In some implementations, the control system is configured to blend in and blend out the coast control offset to and from the driver torque demand over the entry and exit periods at rates based on the accelerator pedal position. In some implementations, the set of preconditions further includes no other vehicle speed control system of the BEV being active. In some implementations, the set of preconditions further includes a vehicle drive mode of the BEV allowing execution of the coast control feature.

According to another example aspect of the invention, a coast control method for a BEV is presented. In one exemplary implementation, the coast control method comprises providing a set of sensors configured to measure at least (i) a vehicle speed of the BEV and (ii) an accelerator pedal position of an accelerator pedal of the BEV, wherein the accelerator pedal is manipulated by a driver of the BEV to provide a driver torque request for the BEV, determining, by a control system of the BEV, a minimum pedal torque for the BEV corresponding to a minimum accelerator pedal position to maintain the BEV traveling at a given speed on a flat surface and carrying a nominal load, based on the minimum pedal torque, calculating, by the control system, maximum acceleration thresholds for the BEV for entry to and exit from a coast control feature of the BEV, respectively, and when a set of preconditions for the coast control feature are satisfied and a vehicle acceleration of the BEV is greater than the maximum acceleration threshold for entry into the coast control feature, executing, by the control system, the coast control feature by decreasing a driver torque request for the BEV and the minimum pedal torque by a coast control offset, wherein the set of preconditions includes the accelerator pedal position being less than an accelerator pedal position threshold indicative of the driver being off of the accelerator pedal.

In some implementations, the coast control method further comprises while the vehicle acceleration remains above the maximum acceleration threshold for entry to the coast control feature, continuing to increase, by the control system, the coast control offset. In some implementations, the coast control method further comprises while the vehicle acceleration remains above the maximum acceleration threshold for entry to the coast control feature, continuing to increase, by the control system, the coast control offset up to a calibratable value. In some implementations, the coast control offset is limited by capacity limits of an electrified powertrain of the BEV.

In some implementations, the decreasing of the driver torque request by the coast control offset comprises blending in the coast control offset to the driver torque request over an entry period. In some implementations, the coast control method further comprises when the vehicle acceleration falls below the maximum acceleration threshold for entry to the coast control feature while remaining above the maximum acceleration threshold for exit from the coast control feature, maintaining, by the control system, the coast control offset. In some implementations, the coast control method further comprises when the vehicle acceleration falls below the maximum acceleration threshold for exit from the coast control feature, ending, by the control system, the coast control feature by blending out the coast control offset from the driver torque demand over an exit period.

In some implementations, the blending in and blending out the coast control offset to and from the driver torque demand over the entry and exit periods is performed at rates based on the accelerator pedal position. In some implementations, the set of preconditions further includes no other vehicle speed control system of the BEV being active. In some implementations, the set of preconditions further includes a vehicle drive mode of the BEV allowing execution of the coast control feature.

Further areas of applicability of the teachings of the present application will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present application are intended to be within the scope of the present application.

DESCRIPTION

As previously discussed, battery electric vehicles (BEVs) are incapable of utilizing engine braking on a downward grade as conventional engine-driven vehicles are capable of doing. Thus, BEVs tend to accelerate more than the driver would expect on a flat grade or compared to a conventional engine-driven vehicle on a downward grade. In these scenarios, the driver must more heavily utilize friction braking, which could cause overheating and excessive wear, particularly for heavy-duty BEV applications capable of carrying large loads (e.g., a heavy-duty BEV pickup truck). Some conventional solutions to this problem include low gear range or manual shift modes or manual transmission gear selections or button-activated aggressive coasting and one-pedal driving features. These conventional solutions, however, require the vehicle to have a transmission, which many BEVs do not have, or require the driver to manually activate or engage a special mode, which he/she may forget to do, particularly when the BEV is quickly accelerating on a downhill grade.

Accordingly, improved coast control techniques for BEVs are presented herein. These techniques automatically perform coast control in a BEV while the driver is off the accelerator pedal and the BEV is coasting. A maximum acceleration entry/exit threshold is calculated based on minimal pedal torque for a flat surface and nominal load. If exceeded, the driver demand (and minimum torque) is decreased by a coast control offset up to a calibratable value (limited by system capacity). If the acceleration stabilizes below the entry threshold but above the exit threshold, the coast control offset is held in place. If the acceleration decreases below the exit threshold, the coast control offset is blended out. Potential benefits include decreased usage of friction brakes and an improved driver experience.

Figure 1:
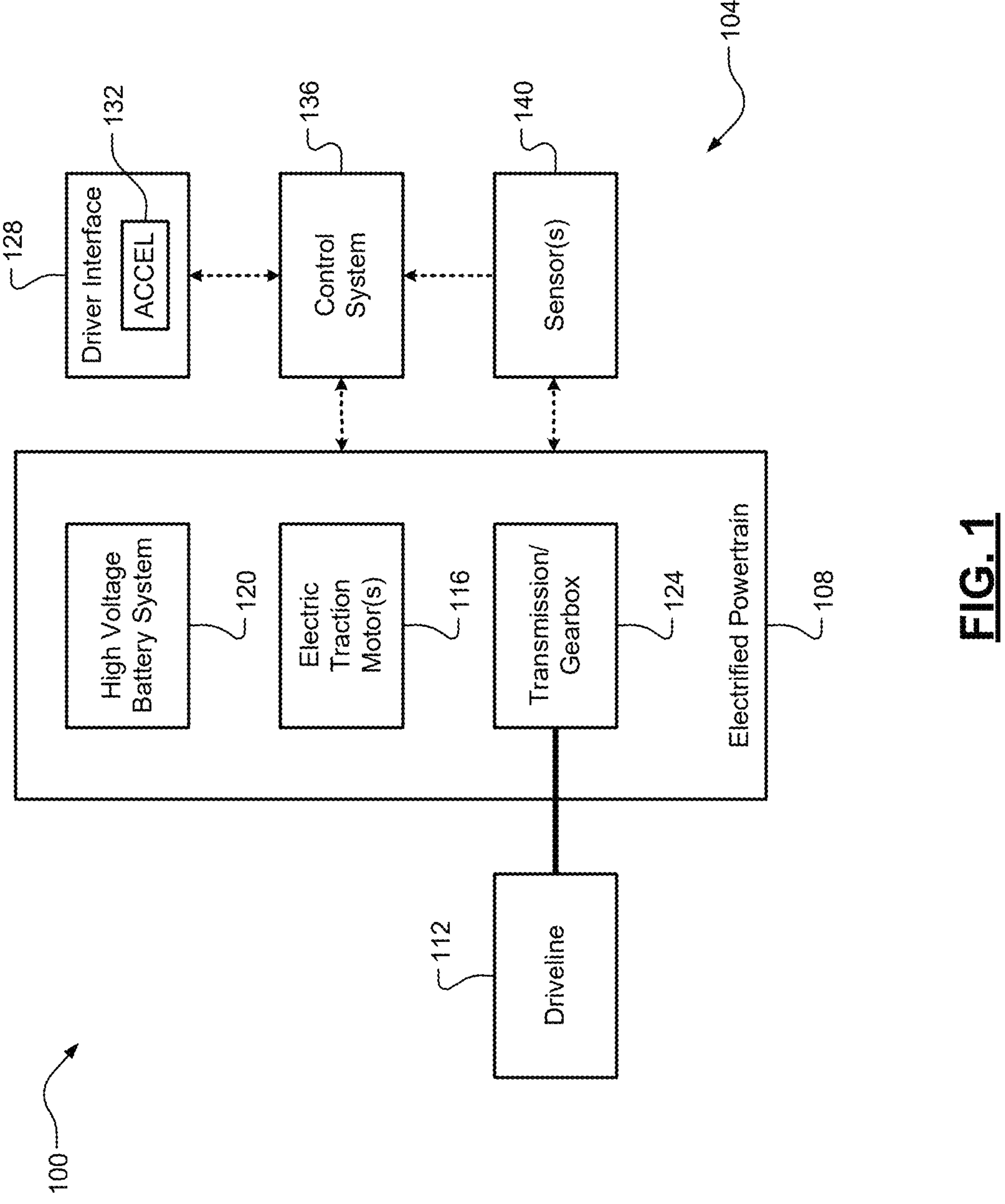
FIG. 1 is a functional block diagram of a battery electric vehicle (BEV) having an example coast control system according to the principles of the present application.

Referring now to FIG. 1, a functional block diagram of a BEV 100 (also “vehicle 100”) having an example coast control system 104 according to the principles of the present application is illustrated. While a BEV configuration for the vehicle 100 is illustrated, it will be appreciated that an electric-only or traditional BEV configuration or a hybrid configuration (e.g., an EREV) having an internal combustion engine that does not provide propulsive torque. The BEV 100 generally comprises an electrified powertrain 108 configured to generate and transfer drive torque to a driveline 112 for propulsion. The electrified powertrain 108 as shown includes one or more electric traction motors 116 that are powered by a high voltage battery pack or system 120 to generate drive torque that is transferred to the driveline 112 via a transmission or gearbox 124. While not shown, it will be appreciated that the electrified powertrain 108 could further include an internal combustion engine and a motor-generator unit (MGU) configured to collectively generate electrical energy for recharging the high voltage battery system 120. In one exemplary implementation, the electrified powertrain 108 includes two electric traction motors 116 (Motor A and Motor B) and an engine/MGU (not explicitly shown).

The electrified powertrain 108 is primarily controlled such that it generates a sufficient amount of drive torque to satisfy a driver torque request, which could be provided by a driver of the BEV 100 via a driver interface 128 that comprises an accelerator pedal (ACCEL) 132. The control of the electrified powertrain 108 involves a controller or control system 136 (e.g., one or more electronic control units, or ECUs) that controls various actuators of the components of the electrified powertrain 108 (inverters for the electric traction motor(s) 116, air/flow/spark for the engine, etc.). This control of the electrified powertrain 108 by the control system 136 could be further based on measurements of vehicle operating parameters from a set of one or more sensors 140. These sensor(s) 140 could measure vehicle operating parameters such as, but not limited to, shaft positions/speeds/accelerations, temperatures, and the like. In one exemplary implementation, the control system 136 comprises an electrified vehicle control unit (EVCU) that controls other sub-controllers, such as a motor control processor (MCP) and an engine control unit (ECU). The specific controls performed by the control system 136 according to the techniques of the present application will now be discussed in greater detail.

Figure 2:
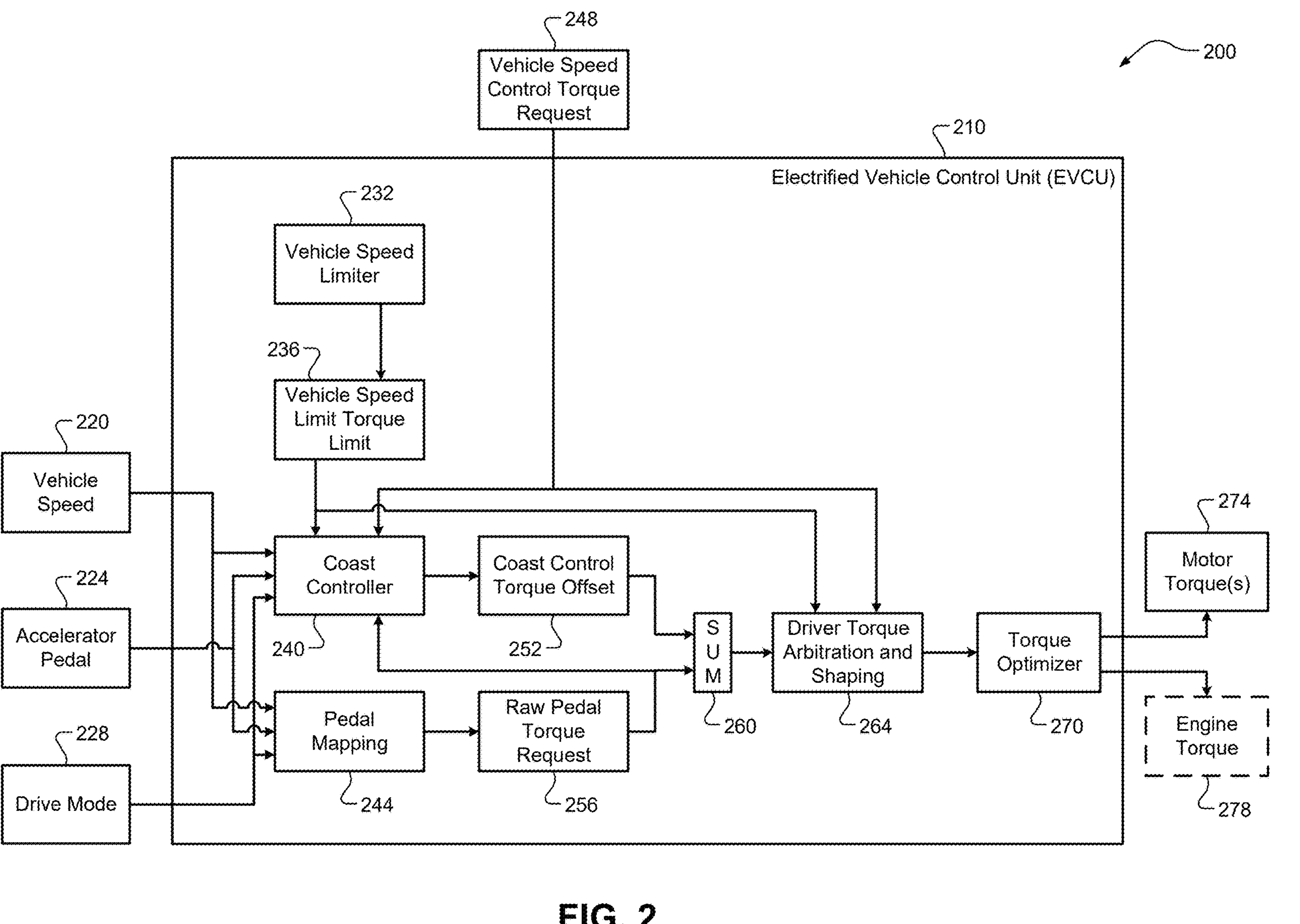
FIG. 2 is a functional block diagram of an example system architecture for the coast control system according to the principles of the present application.

Referring now to FIG. 2 and with continued reference to FIG. 1, a functional block diagram of an example system architecture 200 for the coast control system 104 according to the principles of the present application is illustrated. As illustrated, the system architecture 200 is implemented in an EVCU 210 of the control system 136, but it will be appreciated that the system architecture 200 could be implemented in another ECU/controller or amongst multiple ECUs/controllers. It will also be appreciated that this is merely one example of the system architecture 200 for the coast control system 104. Three primary inputs include vehicle speed 220, accelerator pedal position 224, and a vehicle drive mode 228 (normal, sport, eco, snow, etc.). These values could be known or measured/calculated based on signals/measurements from the sensor(s) 140. These inputs 220, 224, 228 are provided to both a coast controller 240 and a pedal mapping module 244. The pedal mapping module 244 utilizes a predetermined pedal mapping (for the accelerator pedal 132) to determine a raw pedal torque request 256, which is also provided to the coast controller 240.

The coast controller 240 further receives as inputs both a vehicle speed limit torque request 236 (generated by a vehicle speed limiter 236) and a vehicle speed control torque request 248. Based on all of these inputs, the coast controller generates a coast control torque offset, which is summed with the raw pedal torque request 256 by summation block 260 to generate a torque request. This torque request is processed by a driver torque arbitration and shaping module 264, in conjunction with the coast controller 240 and the vehicle speed control torque request, and the processed torque request is optimized by a torque optimizer 270 to obtain an optimized torque request. This (final) optimized torque request is then provided to torque actuators/systems of the electrified powertrain 108 for subsequent control based thereon. This can include, for example, motor torque request(s) 274 provided to the one or more electric traction motors 116 (e.g., Motors A and B) and, optionally, an engine torque request provided to the engine of the electrified powertrain 108.

The functionality of the coast control feature executable by the system architecture 200 (i.e., the coast controller 240) will now be described in greater detail. When the driver releases the accelerator pedal 132 and is coasting (and the other activation criteria of the coast control feature is met) the coast control feature will perform the following steps. First, the coast control feature will calculate a maximum acceleration entry and exit threshold is calculated based on where the minimum accelerator pedal torque would be on a flat surface and nominal load. Next, if the acceleration exceeds the maximum acceleration entry threshold, the coast control feature will decrease the driver demand (and minimum torque) by a coast control offset up to a calibratable value (the offset is also limited by the system capacity). Next, if the acceleration stabilizes below the entry threshold but above the exit threshold, the coast control offset is held in place. Finally, if the acceleration decreases below the exit threshold, the coast control offset is blended out.

Functionally, what this means is that the electrified powertrain 108 will reduce the torque it provides for propulsion of the vehicle 100 to prevent it from accelerating when going down a grade regardless of the load on the vehicle 100. The coast control feature can be calibrated to try and provide a response as if there was no grade or load. Generally what is preferred, however, is to compensate some of the load and prevent the vehicle 100 from accelerating rather than make it as if there was no grade or load. The coast control feature will compensate up to a calibratable torque threshold after which the vehicle 100 is allowed to accelerate away with the calibration changing with the drive mode. Another benefit of implementing the coast control feature within the EVCU 210 is that this module already has accelerator pedal input and other inputs to calculate the driver torque request, which it then uses to calculate the different actuator torque requests as described below.

Figure 3:
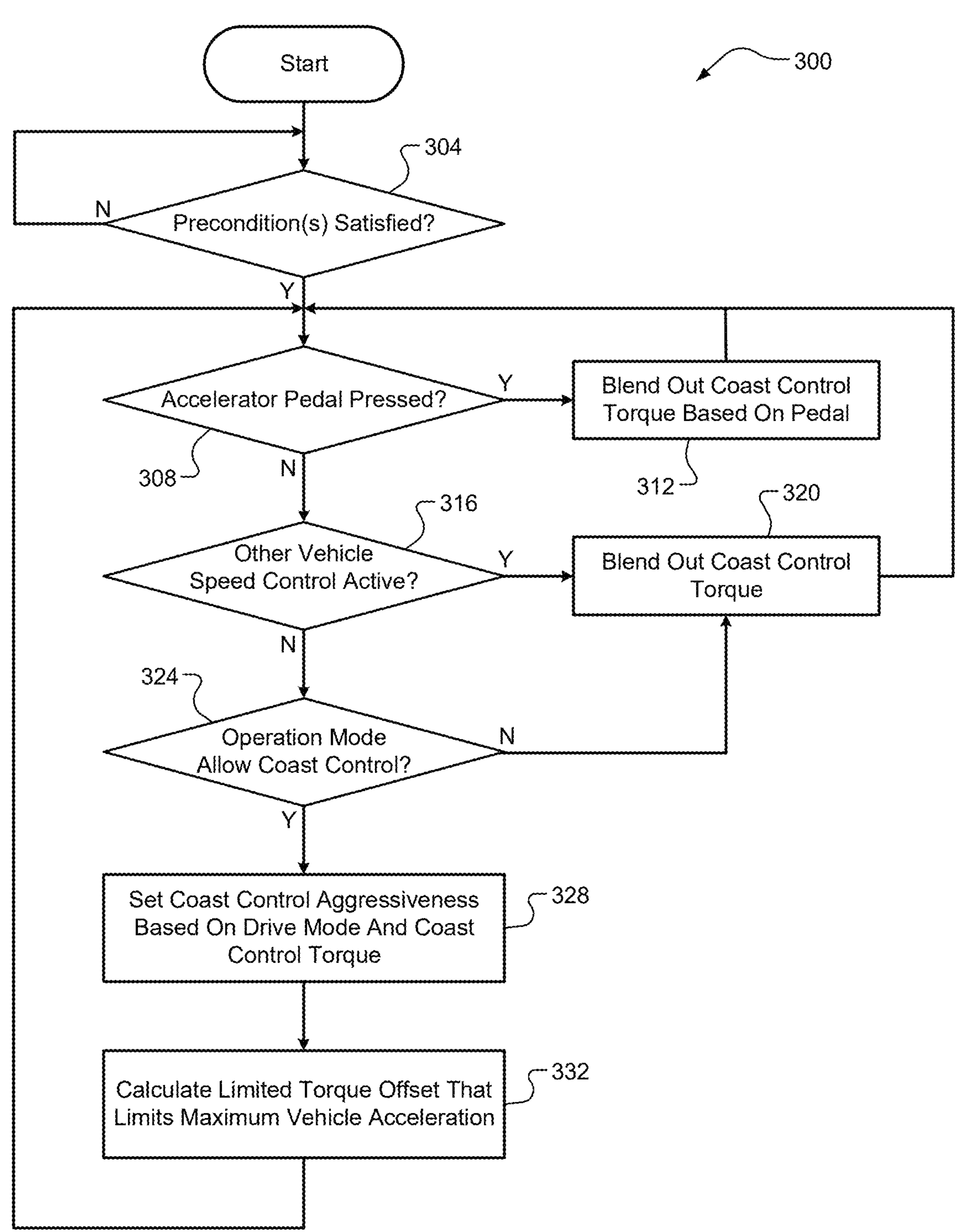
FIG. 3 is a flow diagram of an example coast control method for a BEV according to the principles of the present application.

Referring now to FIG. 3, a flow diagram of an example coast control method 300 for a BEV according to the principles of the present application is illustrated. While the method 300 specifically references the BEV 100 and its components for descriptive/illustrative purposes, it will be appreciated that the method 300 could be applicable to any suitably configured BEV or hybrid (e.g., EREV) vehicle. The method 300 begins at optional 304 where the control system 136 determines whether a set of one or more optional preconditions are satisfied. These precondition(s) could include, for example only, the BEV 100 (the electrified powertrain 108) being powered up and operating in a particular drive mode and there being no malfunctions or faults present that would negatively affect or otherwise impact the operation of the techniques of the present application. As previously mentioned, the coast control feature is only active in particular drive modes, which are the same set of drive modes used to switch pedal maps and the inputs could come from multiple sources. When the precondition(s) are satisfied, the method 300 proceeds to 308. Otherwise, the method 300 ends or returns to 304.

At 308, the control system 136 determines whether the accelerator pedal 132 is on or being pressed. This is because the coast control feature is only active if the driver is off the pedal and coasting. When true, the method 300 proceeds to 312. When false, the method 300 proceeds to 316. For example, the driver could tip-in the accelerator pedal 132 while the coast control feature was active. At 312, while the coast control feature has added a coast control offset to the driver torque request, the offset will be blended out, but as a function of the percent pedal position/depression. For example, if the driver slightly tips in, the offset wouldn't be blended out quickly or at all. Alternatively, for example, if the driver heavily tips in, the offset would blended out quickly. The goal here is to avoid drastic changes in the acceleration for small pedal inputs and there is a desire to keep the overall change in acceleration due to a pedal input the same with this coast control feature on or off. The coast control feature activates if the accelerator pedal percent is less than a calibratable value and the driver torque is close to the minimum pedal value, but only effectively deactivates based on a timer that is a function of the accelerator pedal percentage.

At 316, the control system 136 determines whether another vehicle speed control feature/system is active. These could include, but are not limited to, adaptive cruise control (ACC), select speed control (SSC), engine idle speed control, and the like. When another vehicle speed control feature/system is active, the coast control feature should not be active. For example, a brake system module (BSM) could generate a controller area network (CAN) signal that indicates if another speed controller external to the EVCU 210. For example only, if the BSM wishes to perform an automated braking system (ABS) operation, it will send the EVCU 210 a flag indicating an impending skid event is about to occur. When true, the method 300 proceeds to 320. When false, the method 300 proceeds to 324. At 324, the control system 136 determines whether the current operation/drive mode of the vehicle 100 allows for coast control. When true, the method 300 proceeds to 328. When false, the method 300 proceeds to 320. At 320, if the coast control feature is disabled for any reason other than pedal input, the coast control torque will be blended out (deactivated) after a fixed amount of time (not as a function of acceleration pedal percentage). At 328, the control system 136 sets the aggressiveness of the coast control feature based on the drive mode and the coast control torque offset and, at 332, the control system 136 calculates a limited coast control torque offset that limits the maximum vehicle acceleration.

Separate from (or not specifically shown in) the illustrated method 300 of FIG. 3, this coast control torque offset (from 328) is then utilized to control vehicle acceleration depending on various entry/exit conditions. Specifically, the coast control feature compares the current acceleration (calculated from vehicle speed) and a calculated maximum acceleration (from 332) to determine how much torque to add (relative to an acceleration window). The maximum acceleration entry and exit threshold is calculated based on where the minimum pedal torque would be on a flat surface and nominal load. These maximum acceleration thresholds can be calculated based on vehicle speed and drive mode plus an offset equal to the additional deceleration provided for braking coast control features such as one-pedal driving, aggressive e-coasting, or so on. If the acceleration exceeds the maximum acceleration entry threshold, the coast control feature will decrease the driver demand (and minimum torque) up to a calibratable value (noting that the offset is also limited by the system capacity). The calibration for the maximum magnitude of the coast control offset should be a function based on vehicle speed and drive mode.

If the acceleration stabilizes below the entry threshold but above the exit threshold, the coast control offset is held in place. If the acceleration decreases below the exit threshold, the offset is blended out. Effectively, the coast control offset itself functions as an integral-term (I-Term) feedback controller. The further the acceleration is above the maximum acceleration, the faster the offset is decremented. There is also a further adjustment based on a vehicle speed calculated from the maximum acceleration. The gain for the I-Term is dependent on mode (although torque could be more quickly ramped in a more aggressive mode). The offset should be frozen if the driver presses the brakes, or a stability control function is active. In addition, the coast control offset should not be blended out when the driver is on the brakes as that would cause an acceleration that would fight the deceleration from the brakes, and the offset should not continue to be calculated since the brakes are affecting the current vehicle acceleration rather than the propulsion system.

In addition, coast control torque is not blended out for electronic stability program (ESP) requests (e.g., anti-slip regulation, or ASR, and the like) due to the fact that they can override the driver downstream. The effects of ESP are transitory, and there is a desire to give them a stable driver demand as a reference to blend back to at the end of their intervention. Further, any time the coast control offset is blended out, the calculation is also frozen so that is more stable. As mentioned before, there are min/max values to the coast control offset that are applied. They are primarily based on vehicle speed, drive mode, and are limited by the system capacity. The offset is applied to both the final driver torque request value, as well as lowering the min torque value. The coast control feature shouldn't change the range of torque for a pedal input, and instead should only lower the driver demand by the value of the offset. Since other functions and modules consume the minimum pedal torque, that also needs to be reduced by the offset (though it shouldn't impact the pedal map calculation).

It will be appreciated that the terms "controller" and "control system" as used herein refer to any suitable control device or set of multiple control devices that is/are configured to perform at least a portion of the techniques of the present application. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present application. The one or more processors could be either a single processor or two or more processors operating in a parallel or distributed architecture.

It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A coast control system for a battery electric vehicle (BEV), the coast control system comprising:

a set of sensors configured to measure at least (i) a vehicle speed of the BEV and (ii) an accelerator pedal position of an accelerator pedal of the BEV, wherein the accelerator pedal is manipulated by a driver of the BEV to provide a driver torque request for the BEV; and a control system configured to:

determine a minimum pedal torque for the BEV corresponding to a minimum accelerator pedal position to maintain the BEV traveling at a given speed on a flat surface and carrying a nominal load;

based on the minimum pedal torque, calculate maximum acceleration thresholds for the BEV for entry to and exit from a coast control feature of the BEV, respectively; and when a set of preconditions for the coast control feature are satisfied and a vehicle acceleration of the BEV is greater than the maximum acceleration threshold for entry into the coast control feature, execute the coast control feature by decreasing a driver torque request for the BEV and the minimum pedal torque by a coast control offset, wherein the set of preconditions includes the accelerator pedal position being less than an accelerator pedal position threshold indicative of the driver being off of the accelerator pedal.

2. The coast control system of claim 1, wherein the control system is further configured to, while the vehicle acceleration remains above the maximum acceleration threshold for entry to the coast control feature, the control system continues to increase the coast control offset.

3. The coast control system of claim 2, wherein the control system is further configured to, while the vehicle acceleration remains above the maximum acceleration threshold for entry to the coast control feature, the control system continues to increase the coast control offset up to a calibratable value.

4. The coast control system of claim 3, wherein the coast control offset is limited by capacity limits of an electrified powertrain of the BEV.

5. The coast control system of claim 1, wherein the control system is configured to decrease the driver torque request by the coast control offset by blending in the coast control offset to the driver torque request over an entry period.

6. The coast control system of claim 5, wherein the control system is further configured to, when the vehicle acceleration falls below the maximum acceleration threshold for entry to the coast control feature while remaining above the maximum acceleration threshold for exit from the coast control feature, maintain the coast control offset.

7. The coast control system of claim 6, wherein the control system is further configured to, when the vehicle acceleration falls below the maximum acceleration threshold for exit from the coast control feature, end the coast control feature by blending out the coast control offset from the driver torque demand over an exit period.

8. The coast control system of claim 7, wherein the control system is configured to blend in and blend out the coast control offset to and from the driver torque demand over the entry and exit periods at rates based on the accelerator pedal position.

9. The coast control system of claim 1, wherein the set of preconditions further includes no other vehicle speed control system of the BEV being active.

10. The coast control system of claim 9, wherein the set of preconditions further includes a vehicle drive mode of the BEV allowing execution of the coast control feature.

11. A coast control method for a battery electric vehicle (BEV), the coast control method comprising:

providing a set of sensors configured to measure at least (i) a vehicle speed of the BEV and (ii) an accelerator pedal position of an accelerator pedal of the BEV, wherein the accelerator pedal is manipulated by a driver of the BEV to provide a driver torque request for the BEV;

determining, by a control system of the BEV, a minimum pedal torque for the BEV corresponding to a minimum accelerator pedal position to maintain the BEV traveling at a given speed on a flat surface and carrying a nominal load;

based on the minimum pedal torque, calculating, by the control system, maximum acceleration thresholds for the BEV for entry to and exit from a coast control feature of the BEV, respectively; and when a set of preconditions for the coast control feature are satisfied and a vehicle acceleration of the BEV is greater than the maximum acceleration threshold for entry into the coast control feature, executing, by the control system, the coast control feature by decreasing a driver torque request for the BEV and the minimum pedal torque by a coast control offset, wherein the set of preconditions includes the accelerator pedal position being less than an accelerator pedal position threshold indicative of the driver being off of the accelerator pedal.

12. The coast control method of claim 11, further comprising while the vehicle acceleration remains above the maximum acceleration threshold for entry to the coast control feature, continuing to increase, by the control system, the coast control offset.

13. The coast control method of claim 12, further comprising while the vehicle acceleration remains above the maximum acceleration threshold for entry to the coast control feature, continuing to increase, by the control system, the coast control offset up to a calibratable value.

14. The coast control method of claim 13, wherein the coast control offset is limited by capacity limits of an electrified powertrain of the BEV.

15. The coast control method of claim 11, wherein the decreasing of the driver torque request by the coast control offset comprises blending in the coast control offset to the driver torque request over an entry period.

16. The coast control method of claim 15, further comprising when the vehicle acceleration falls below the maximum acceleration threshold for entry to the coast control feature while remaining above the maximum acceleration threshold for exit from the coast control feature, maintaining, by the control system, the coast control offset.

17. The coast control method of claim 16, further comprising when the vehicle acceleration falls below the maximum acceleration threshold for exit from the coast control feature, ending, by the control system, the coast control feature by blending out the coast control offset from the driver torque demand over an exit period.

18. The coast control method of claim 17, wherein the blending in and blending out the coast control offset to and from the driver torque demand over the entry and exit periods is performed at rates based on the accelerator pedal position.

19. The coast control method of claim 11, wherein the set of preconditions further includes no other vehicle speed control system of the BEV being active.

20. The coast control method of claim 19, wherein the set of preconditions further includes a vehicle drive mode of the BEV allowing execution of the coast control feature.

* * * * *